3,038,954
BATTERY CAP

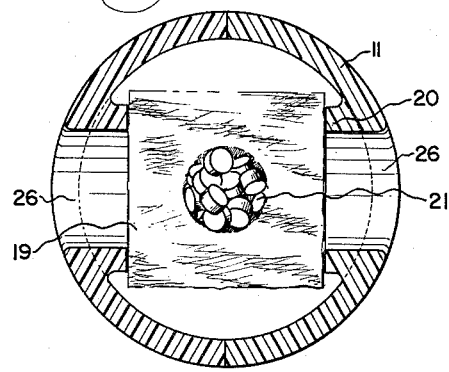
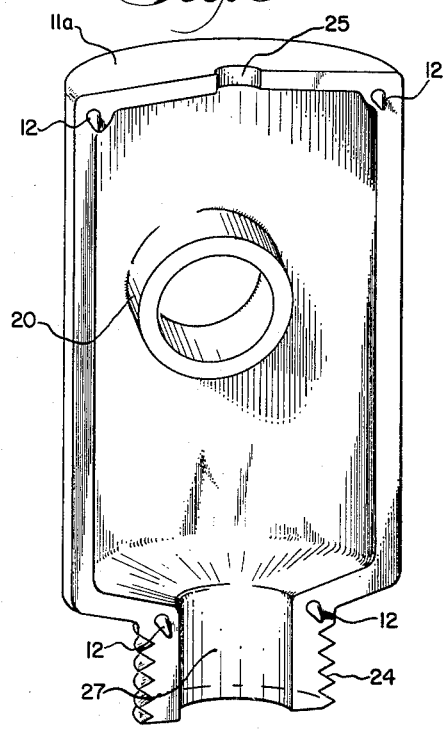
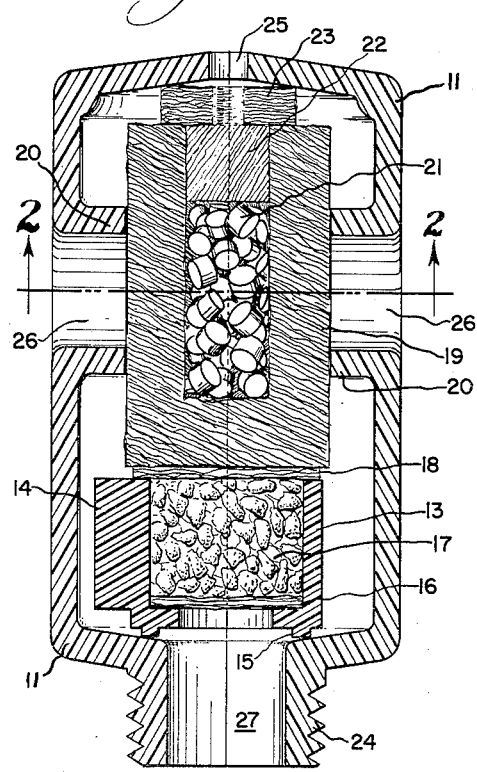
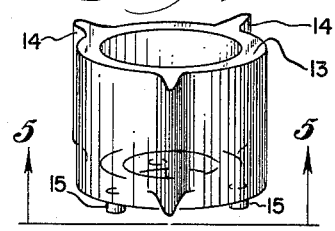
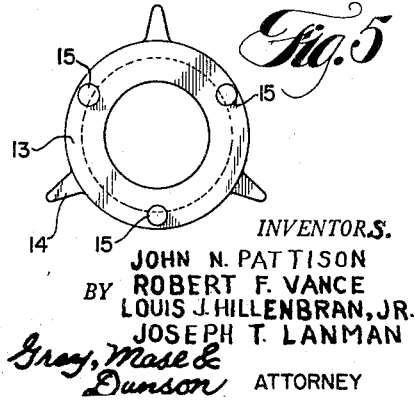

John N. Pattison, Newport, Tenn., Robert F. Vance, Louisville, Ky., and Louis J. Hillenbrand, Jr., and Joseph T. Lanman, Columbus, Ohio, assignors, by mesne assignments, to the United States of America as represented by the Secretary of the Navy
Filed Jan. 20, 1960, Ser. No. 3,666
4 Claims. (Cl. 136—179)

This invention relates to battery caps. More particularly, it relates to catalytic battery caps designed to promote the water-forming reaction of hydrogen gases generally emitted from storage batteries.

With batteries of the lead storage type, hydrogen and other gases are released from the battery at various cycles during the battery's use. The major dangers inherent in this giving off of gases by the battery are two in number. First, the gas mixtures given off may accumulate as explosive mixtures which can be ignited by heat or electrical or static sparks. Second, the giving off of hydrogen and oxygen gases from the battery results in a depreciation of the supply of battery water, necessitating more frequent attention and filling of the battery with water. Thus, the problems involved are (1) to keep explosive gas mixtures from accumulating around the battery and (2) to prevent the depletion of battery water by recombining the hydrogen and oxygen gases given off to form water and returning the water to the battery.

In the past, many battery caps have been designed to catalytically recombine the hydrogen and oxygen gases released by the battery to form water which can be returned to the battery. Among other problems these devices have encountered is the problem of contamination of the catalysts. Because of the presence of antimony in the plates of the battery, stibine gas is given off by the battery. This stibine gas, if allowed to reach the catalyst material, has such properties that it would poison the action of the catalyst. Thus, an efficient catalytic battery cap should include means for removing the stibine gas from the upward flow of gases off the battery.

Also used in the past in areas in which there was danger of explosive-gas-mixture accumulation were catalytic-reactor units which were placed and suspended throughout the area subjected to such accumulation. Although these units have been very successful in preventing explosions, the units are not battery caps and do not return the water which is catalytically recombined to the battery cells. A torpedo chamber is an example of the type of closed battery compartment which is most subjected to the accumulation of explosive-gas mixtures.

It is an object of the present invention to provide a novel catalytic battery cap which will serve the functions both (1) of returning water to the batteries and (2) of eliminating the hazard of accumulated explosive-gas mixtures in the battery compartment.

It is another object to provide a battery cap which includes means for preventing the catalyst from poisoning.

It is a further object to provide a catalytic battery cap in which the reaction rate, at which the hydrogen and oxygen may combine to form water, is controlled so as to prevent overheating of the catalyst from such exothermic water-forming reaction.

Additionally, it is an object and feature of the present invention to provide an improved catalytic battery cap and catalytic reactor unit for such cap which has the ability to admit oxygen from the outside air for combustion of hydrogen-rich gases and which has long shelf life, long service life, ability to return water to the battery, and ability to stand high gassing rates, cold temperatures, battery acid, sea water, stibine, gasoline and kerosene vapors, and shock. Other objects and features of the catalytic reactor unit and battery cap of the present invention will become apparent as the description proceeds.

In the drawings:

FIG. 1 is a side view in cross section of a preferred embodiment of the battery cap of the present invention;

FIG. 2 is a top view in cross section of the battery cap of FIG. 1 through the section 2—2;

FIG. 3 is a perspective view of a portion of the battery cap casing used in the preferred embodiment illustrated by FIGS. 1 and 2;

FIG. 4 is a perspective view of a holder 13 shown in FIG. 1; and

FIG. 5 is a bottom view (in the direction 5—5) of the holder 13 of FIG. 4.

As shown by the figures, and with special reference to FIG. 1, the construction of the battery cap of the present invention includes a clear plastic housing 11. A transparent plastic, such as polystyrene, is preferred. The housing 11 is preferably built of two symmetrical half sections. A pictorial representation of one half section 11a is shown in FIG. 3. Four lugs 12 on one half section 11a match four similarly located holes in the other half section so that the two half sections of the housing may be fitted together. A plastic stibine-remover holder 13 (protective-powder cup), shown in FIGS. 1, 4, and 5, is situated in the housing 11 at its base. This holder 13, like the housing 11, is substantially cylindrical in structure. Three wings 14 on the holder 13 serve to position the holder centrally within the housing. Three short legs 15 raise the holder slightly above the base of the housing. A circular Fiberglas pad 16 rests on the internal base of the holder 13. Lead-oxide-coated alumina powder 17 is contained by the holder 13. Another Fiberglas pad 18 serves to seal the top of the holder 13. Centrally disposed in the housing 11 and resting on top of the pad 18 is the Fiberglas catalyst holder 19. The Fiberglas catalyst holder 19 fits tightly against the inset conduits or portholes 20 in the housing 11. Catalyst pellets 21, preferably palladium on alumina, fill the hollow interior of the Fiberglas holder 19. A Fiberglas plug 22 closes off the catalyst holder 19 to form a completely enclosed catalyst unit. Fitted at the top of the holder 19 and up against the housing 11 is a Fiberglas washer 23. The housing 11 contains a threaded base 24, which may be adapted to fit a particular battery.

The housing 11 contains a vent 25 in the upper central location. The two cylindrical sections 20 in the housing 11 push tightly against opposite sides of the holder 19 and form ports 26 connecting the holder 19 to the outside atmosphere. A conduit or passageway 27 at the base of the housing 11 serves to connect the atmosphere of the battery with the inside of housing 11.

The Fiberglas preferred is a tight-packed silicone-treated Fiberglas forming an air-permeable, water-repellent substance. Thus, the battery cap of the present invention, when attached to the top of a liquid-filled battery, provides a liquid-impermeable cap preventing overflow and spillage of the battery fluid. Yet the battery cap, being gas-permeable, allows both access of battery gases to pass into the cap and oxygen from the outside atmosphere to pass through ports 26 into the catalytic area containing the catalytic pellets 21.

When attached to the top of a gas-evolving battery, the operation of the battery cap of the present invention is as follows: The hydrogen- and stibine-containing battery gases pass from the battery through passageway 27 and into the stibine-remover holder 13. The Fiberglas pad 16 allows free passage of these gases into the interior of the holder 13. The stibine in the battery gas is removed during passage of the gas through the lead-oxide-coated alumina powder 17 and the rest of the gaseous constituents pass through the Fiberglas pad 18 and into the catalytic area 21 by way of the Fiberglas holder 19. Here, due to the action of the palladium catalyst, the hydrogen in the battery gas is combusted with oxygen, which may be brought in as needed through the ports 26 from the outside atmosphere, whereby water vapor is formed. The water vapor formed is prevented from condensing on the catalyst holder 19 by the water-repellent nature of the Fiberglas and, thus, condenses on the inside walls of the housing 11. Some of the water vapor, of course, leaves the battery cap through the ports 26, but most of it condenses inside the cap. This condensed water then runs down the inside walls of the battery cap to the base of the cap and then underneath the holder 13 and down the passageway 27, by gravity, into the battery compartment. The legs 15 on the holder 13 are short so that the clearance between the holder 13 and the base of the housing 11 is small enough that the surface tension of the water prevents the water from freely running through this clearance area until enough water has collected to provide a high enough head to force the water through. Thus, during operation of the battery cap, a sealing film of water always exists around the base of the holder 13 and prevents the battery gas from passing into the cap without going into the holder 13 first.

Because of the highly exothermic nature of the water-forming reaction, it is desirable to control the rate at which this reaction may take place. The reaction rate may be controlled by controlling the geometry and length of the gas-diffusion paths to the area of the catalyst. It is a feature of the present invention that the catalytic area is surrounded by Fiberglas, and the porosity and permeability of this Fiberglas catalyst holder may be controlled by regulation of (1) the wall thickness of the Fiberglas block, (2) the wall permeability (by varying the "tightness-of-pack") of the Fiberglas, and (3) the porous wall area (e.g., by painting).

What is claimed is:

1. A catalytic reactor unit adapted to catalyze the water-forming reaction of oxygen and hydrogen gases evolved from an electrolytic cell, comprising; a housing adapted to be attached to an electrolytic cell, the interior of said housing defining a reaction chamber, a catalyst holder composed of gas-permeable, water repellant material disposed within said housing, a catalyst enclosedly retained within said holder, means for supplying an abundance of ambient air directly to said holder whereby said catalyst is subjected to an oxygen-laden atmosphere, an inlet in said housing for receiving gases from said electrolytic cell and so disposed as to direct said gases through said holder to said catalyst, and a vent arranged in said housing to enable the escape of gases therefrom after passage through said catalyst.

2. A catalytic reactor unit adapted to catalyze the water-forming reaction of oxygen and hydrogen gases evolved from an electrolytic cell, comprising; a housing adapted to be attached to an electrolytic cell, the interior of said housing defining a reaction chamber, a catalyst holder composed of gas-permeable, water repellant material disposed within said housing, a catalyst enclosedly retained within said holder, at least one conduit with one end open to ambient air and the other end directly abutting said material whereby an abundance of uncontaminated, ambient air is available in the immediate area of the catalyst to assure complete reaction of the hydrogen gas, an inlet in said housing for receiving gases from said electrolytic cell and so disposed as to direct said gases through said holder to said catalyst, and a vent arranged in said housing to enable the escape of gases therefrom after passage through said catalyst.

3. A catalytic reactor unit adapted to catalyze the water-forming reaction of oxygen and hydrogen gases evolved from an electrolytic cell, comprising; a housing adapted to be attached to an electrolytic cell for receiving the gases therefrom, a catalyst holder composed of gas-permeable, water resistant material disposed within said housing, a catalyst enclosedly retained within said holder, cleaning means for removing catalyst-poisoning materials from said gases disposed within said housing, channeling means for sequentially routing said gases from said electrolytic cell, through said cleaning means, to said holder, a chamber within said housing for condensing the water vapor formed by said water-forming reaction, sealing means within said housing for utilizing said water to provide a seal between said chamber and said channeling means and ambient-air access means to directly provide said holder with a supply of uncontaminated air and thus provide said catalyst with a quantity of oxygen in excess of the stoichiometric amount to assure a substantially complete reaction of the hydrogen gas.

4. A catalytic reactor unit adapted to catalyze the water-forming reaction of oxygen and hydrogen gases evolved from an electrolytic cell, comprising; a housing adapted to be attached to an electrolytic cell, an inlet in said housing for receiving gases from said electrolytic cell, a first holder in said housing adapted to receive said gases from said inlet, a reactant in said first holder for removing catalyst poisoning materials from said gases, a second holder composed of gas-permeable, water repellant material on top of said first holder, means between said first and said second holders for permitting the passage of gases therebetween a catalyst enclosedly retained in said second holder for catalyzing the water-forming reaction of oxygen and hydrogen, first means for spacing said first and second holders from said housing to provide a chamber for condensing the water vapor formed by said reaction, second means for spacing said first holder from said housing whereby collected, condensed water-vapor forms a seal between said inlet and said chamber, a vent in said housing to enable the escape of gases therefrom after passage through said catalyst, and at least one conduit with one end open to ambient air and the other end in intimate proximity with said second holder, whereby a quantity of oxygen in excess of the stoichiometric amount will be available in the immediate area of the catalyst to assure a substantially complete reaction of the hydrogen gas.

References Cited in the file of this patent

UNITED STATES PATENTS

| | | |
|---|---|---|
| 2,465,202 | Craig | Mar. 22, 1949 |
| 2,615,062 | Craig | Oct. 21, 1952 |
| 2,687,449 | Gullick | Aug. 24, 1954 |

FOREIGN PATENTS

| | | |
|---|---|---|
| 5,816 | Great Britain | of 1889 |